July 19, 1938.    S. F. GLEASON    2,123,889
COUPLING AND REPAIR LINK
Filed April 3, 1937    2 Sheets-Sheet 1
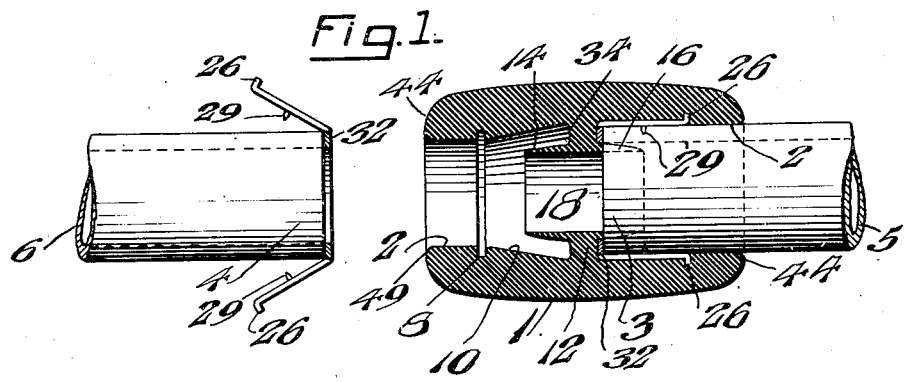
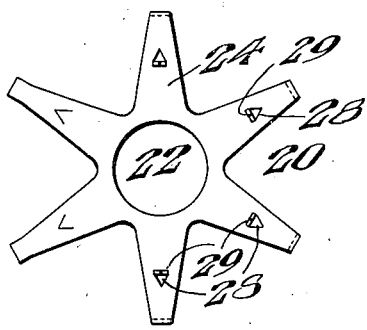
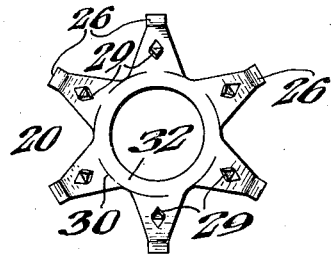
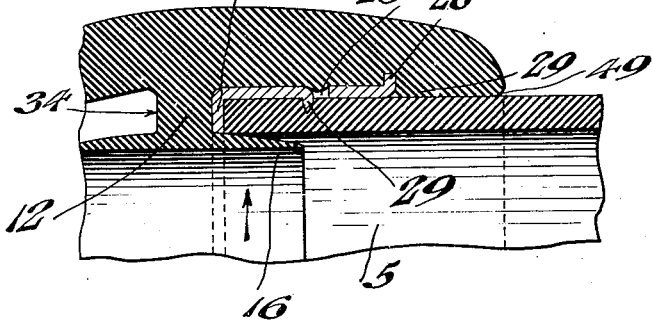
INVENTOR
Stanley F. Gleason
BY
ATTORNEY July 19, 1938.    S. F. GLEASON    2,123,889
COUPLING AND REPAIR LINK
Filed April 3, 1937    2 Sheets-Sheet 2
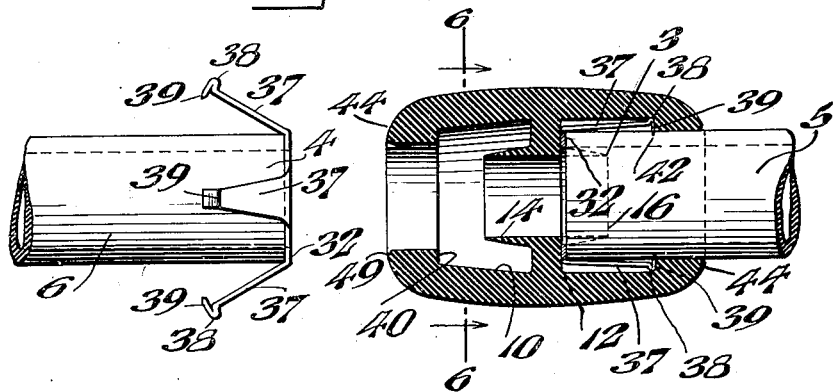
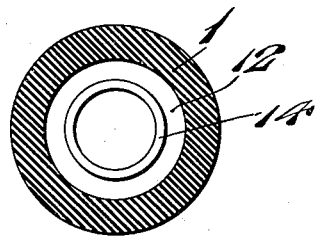
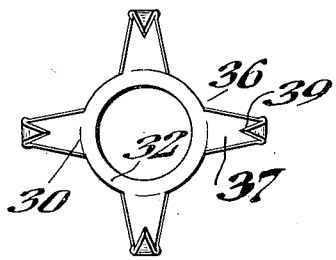
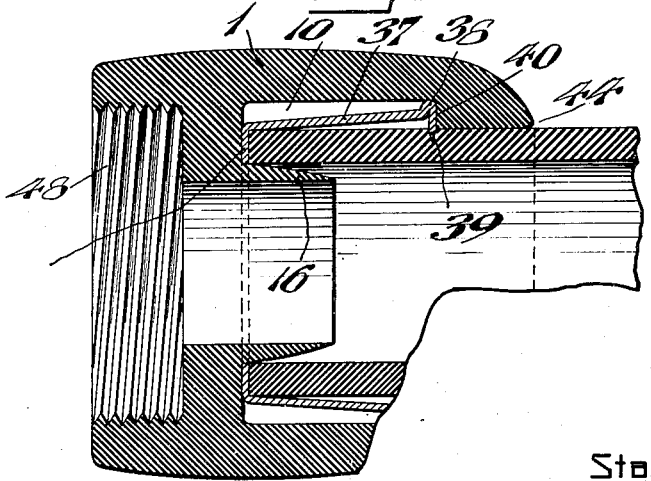
INVENTOR
Stanley F. Gleason
BY
ATTORNEY Patented July 19, 1938

2,123,889

UNITED STATES PATENT OFFICE 2,123,889

COUPLING AND REPAIR LINK

Stanley F. Gleason, Philadelphia, Pa., assignor of one-half to Louis Necho, Lansdowne, Pa.

Application April 3, 1937, Serial No. 134,705

3 Claims. (Cl. 285—71)

My invention relates to a new and useful coupling and repair link and it relates more specifically to a coupling and repair link especially adapted for use in connecting the ends of two hose sections together in an air and water tight manner and without the use of multi-part fittings and without the aid of any special tools, strength or skill.

My invention relates still more specifically to a coupling and repair link by means of which two pieces of hose, such as rubber garden hose, or the like, may be connected to form an extension, or whereby, when a hole develops in a given length of hose, the damaged portion may be cut out and the remaining parts may be coupled together.

There are numerous devices now known and used for connecting hose sections together either for extension or for repair but such devices consist of special metallic fittings which involve the use of gaskets and in which two or three separate fittings may be employed to effect the desired connection and in which such fittings can not be applied without the use of tools such as pliers, hammers and the like and which the average householder or user cannot conveniently fit together. Furthermore, even though the cost of such fittings has been brought down to the lowest possible figure, it still is rather high due to the necessity of buying more than one part, and due to the fact that the metal fittings referred to are initially expensive to manufacture.

Furthermore, the fittings now known and used constitute an objectionable protuberance, so that, if two sections of garden hose are connected by means of such fittings and the garden hose is dragged on the lawn, the metallic, relatively sharp protuberances tend to damage the lawn and to catch on obstructions.

It is therefore the further object of my invention to produce a smooth surfaced, soft, light and flexible coupling and repair link by means of which it is possible to couple two sections of hose together in a manner which does not materially alter the appearance or contour of the hose so as to give, for all practical purposes, the same effect, appearance, advantage and flexibility of an integral piece of hose.

Metallic fittings used for coupling or repairs on a rubber hose are not, as a rule, sufficiently tight to prevent all leakage and, if initially made tight, they tend, under changes of temperature as the result of changes taking place in the consistency of the rubber over a period of time, to become loose necessitating further adjustment and, in some instances, necessitating cutting out of the ends of the hose and the application of new fittings.

According to my invention I use a coupling and repair link which is made of substantially the same rubber composition from which the hose is made so that there will be no difference of reaction between the coupling and the hose under varying conditions. Furthermore, by utilizing an elastic coupling, I produce a permanently air and water tight connection and, in addition to its elasticity, my novel coupling includes means disposed within the coupling and adapted to be acted on by pressure within the hose further to tighten the connection.

The full nature of my invention, its construction and advantages will be more clearly understood from the following specification in connection with the accompanying drawings in which:

Fig. 1 represents a composite view partly in section and partly in elevation showing my novel coupling and repair link applied to the end of one hose section and prior to its application to the end of the other hose section.

Fig. 2 represents a greatly enlarged, fragmentary section of the right hand portion of Fig. 1 showing details of construction.

Fig. 3 represents a plan view of the washer forming part of the construction showing the latter only partially prepared for use.

Fig. 4 represents a plan view of the washer shown in Fig. 3 completely prepared and ready for application to the end of the hose to be connected.

Fig. 5 represents a view similar to Fig. 1 showing a slight modification.

Fig. 6 represents a section on line 6—6 of Fig. 5.

Fig. 7 represents a plan view of a modified form of washer used in the construction shown in Fig. 5.

Fig. 8 represents a fragmentary sectional view showing a further modified form of the invention.

Referring to the drawings in which like reference characters represent like parts, my coupling and repair link consists mainly of the substantially, cylindrical and flexible member 1 which is provided at opposite ends thereof with the openings 2 which are of a size adapted to accommodate in a snug fit the ends 3 and 4 of the hose sections 5 and 6 to be coupled. The openings 2 are practically of a cylindrical contour until the annular groove, seat, or recess 8 is reached. From the opposite side of the recess 8 towards the center of the coupling 1 I have provided a gradually flared opening 10. Within the body portion 1 and, located substantially centrally thereof, I provide the inwardly projecting annular flange 12 from which extend, in opposite directions, the annular flanges 14 and 16, the inner faces of which together with the inner face of the flange 12, constitute a central passage 18 interconnecting the openings 2 and 10 at either end of the coupling 1. In order to provide means for automatically, permanently and tightly locking the ends 3 or 4 of the hose in either of the openings 2 or 10 I provide the washer 20 which may be of any desired shape, such as that illustrated in Fig. 3, which is provided with a center opening 22 and one or more arms 24. The ends of the arms 24 are deflected as at 26 and from the arms are punched out as at 28 the tongues 29. The washer 20 is then scored along the line 30 to form a seat 32 corresponding substantially to the thickness of the wall of the hose section 5 or 6. When it is desired to connect the two sections 5 and 6 by means of my coupling 1, I take a washer 20, as shown in Fig. 4, and apply it to the end 3 or 4 of the hose section 5 or 6 and, due to the fact that I preferably make this washer out of a spring metal, the parts will now appear as shown at the left hand side of Fig. 1. With the seat 32 of the washer engaging the end of the hose I then insert the end of the hose through the opening 2 until it abuts against the corresponding side of the flange 12. In this position the deflected ends 26 of the arms 24 of the washer 20 engage the recess 8 while the tongues 29 are driven into the body of the hose section 5 or 6, as clearly seen in Fig. 2. The resiliency of the arms 24, in their tendency to spring out, tends to make a very tight engagement between the end of the hose and the wall of the opening 10 and tends to keep the deflected edges 26 in close and direct abutment against the edges of the recess 8 to prevent loosening or withdrawal. When the end of the hose has been inserted, as shown in Fig. 2, the cylindrical flange 14 or 16, depending on which end of the coupling is being considered, enters into the end of the hose section 5 or 6 and the pressure of the water or other fluid tends to compress the relatively flexible flange 16 against the inner wall of the tube section in the direction of the arrow shown in Fig. 2 thus further tightening the connection against withdrawal and leakage. While the annular flanges 14 and 16, extending in opposite directions from the central annular flange 12, are desirable and helpful in accomplishing the purposes of my invention, it is clearly seen that my novel coupling will be adequate for the purposes for which it is intended even if, in order to decrease the cost, the flanges 14 and 16 were to be omitted, since, in that event, the ends of the hose section 5 or 6 still abut against the flange 12 and by making the distance between the recess and the innermost edge 34 of the openings 10 slightly smaller than the lengths of the arms 24, as shown at the left hand side of Fig. 1, it will be necessary to effect a little compression of the end of the flange 12 and a little extension of the body of the coupling to permit insertion of the hose, as shown at the right hand side of Fig. 1, which will assure a substantially tight connection.

In Figs. 5 to 7 I have shown a modified form of construction in which I use a different form of washer 36 having the arms 37, the ends of which are deflected outwardly as at 38 and inwardly as at 39 in lieu of the punching of the tongues as shown in Figs. 3 and 4. In this construction I omit the recess 8 shown in Fig. 1 and provide the inwardly flaring opening 10 with a shoulder 40 so that, when the end of the hose is inserted, it abuts against the side of the flange 12 with the hump 38 on the arms 37 engaging the shoulder 40, and with the deflected ends 39 serving as prongs which enter or dig into the body of the hose as at 42. In this construction also, if desired, the flanges 14 and 16 could be omitted without departing from the spirit or the scope of my invention.

It will thus be seen that when two pieces of hose 5 and 6 are connected by means of my coupling 1, there is no evidence of any mending or any special connecting means since the coupling 1 may be made of the same material as the body of the hose, and it will further be seen that the coupling presents an exteriorly smooth surface with no protuberances such as screw-bolts and nuts or collars or the like which may catch on obstructions and cause damage or be damaged themselves. It will further be seen that my novel coupling affords a flexible connection which, being made of the same material as the hose, will react the same as the hose under atmospheric or other conditions thus assuring permanency of the tight fit originally attained. While I have shown my novel coupling 1 as being applied to the connection of two sections of hose, it is of course understood that if a hole develops in the hose the damaged portion is cut out so as to present two square ends such as shown at 3 and 4 which can then be connected in the manner set forth.

In the drawings, and for the purpose of clear illustration, I have perhaps slightly exaggerated the thickness of the walls of the coupling 1, but I want it understood that in actual manufacture the edges 44 of the coupling 1 need not be so rounded and need not present such an abrupt rise with respect to the cylindrical plane of the hose sections 5 and 6, and, if desired, the walls of the coupling 1 can be extended to the right and left of Figs. 1 and 6 so as to taper gradually towards the level or cylindrical plane of the hose section being connected. Since it will be obvious to anyone skilled in the art as to how this can be done, I deem it unnecessary to show the same in detail. Since the cost of stamping the washers shown, or any similar washers, is extremely small, and since my coupling can also be inexpensively produced by a two-part mold, it will be seen that my entire coupling, including the washer, can be made and sold at a much lower cost than the cost of the metallic fittings now in use. It will also be seen that no tools or no special skill is needed in connecting the ends of a hose by means of my coupling since all that is necessary is to place the washer against the end of the hose as shown at the left hand side of Figs. 1 and 5 and then to force the end of the hose into the coupling as far as it will go.

While I have, in the drawings, illustrated a coupling and repair link made of flexible material such as a rubber compound and illustrated it in particular connection with the coupling and repairing of a rubber hose such as a garden hose, it is to be understood that the body portion 1 of the coupling as well as the center flange 12 with or without the cylindrincal extensions 14 and 16 may be made of a soft metal into which the ends of metallic tubes can be driven with or without the intervention of suitable gaskets, and that the tubular member 1 with its abutment flange 12 may be made of metal with a rubber felt or similar lining where rigidity is desired, the main principle of my invention being the provision of the tubular body portion with the central abutment flange forming a partition against which the ends of the hose to be connected may abut, together with means adapted to lock or secure the end of the hose within the tubular member after the hose is inserted into said tubular member, and the locking or securing of the hose within the tubular member being the necessary result of the inserting operation and not in the nature of a secondary or dependent operation.

In Fig. 8 I have shown a modified form of my invention in which one-half of the coupling 1 is made according to the disclosure of Fig. 1 or Fig. 2, that is, for coupling the end of a hose by means of the washer 20 or 36 and the arms 24 or 37 while the other half of the coupling 1 is threaded as at 48 to receive the threaded end of a hose to be coupled. Thus, when it is desired to repair a hose by cutting out the damaged portion, we have two square cut ends such as shown in Figs. 1 and 5 and they are coupled together in the manner shown. If, however, it is desired to couple a piece of hose which has a square cut end, as shown, to another piece of hose the end of which is already equipped with a threaded sleeve in the usual manner, then the threaded end of the hose having the threaded sleeve is threaded into the threaded end 48 of the coupling while the square cut end of the additional hose to be connected is inserted in the opposite end of the coupling.

It will be noted that the outer edges of the openings 2 are outwardly flared or rounded as at 49 to facilitate insertion of the ends of the hose sections to be coupled.

Having thus described my invention, what I claim as new and desire to secure by Letters Patent is:

1. A coupling and repair link comprising a tubular member, a flange on the inner wall of said tubular member dividing the bore of said tubular member into two communicating chambers each of which is adapted to receive the end of a hose section, an internal shoulder formed in each of said chambers in advance of the outer end thereof, and means adapted to abut against said shoulder and engaging the ends of said hose sections for locking the latter in position comprising washers having extensions adapted to engage said hose sections and said shoulders.

2. A coupling and repair link comprising a tubular member, a flange on the inner wall of said tubular member dividing the bore of said tubular member into two communicating chambers each of which is adapted to receive the end of a hose section, an internal shoulder formed in each of said chambers in advance of the outer end thereof, and means adapted to abut against said shoulder and engaging the ends of hose sections for locking the latter in position comprising spring washers having resilient extensions adapted to engage said hose sections and said shoulders.

3. A coupling and repair link comprising a tubular member, a flange on the inner wall of said tubular member dividing the bore thereof into two communicating chambers each of which is adapted to receive the end of a hose section, one of said chambers being internally threaded and the other of said chambers having an abutment formed therein intermediate said flange and the outer end of said opening, and means engaging the end of a hose section and bearing upon said abutment for locking said hose section in position comprising spring washers having extensions adapted to engage said hose section and said abutment.

STANLEY F. GLEASON.